United States Patent [19]
Williams

[11] Patent Number: 5,979,776
[45] Date of Patent: Nov. 9, 1999

[54] WATER FLOW AND TEMPERATURE CONTROLLER FOR A BATHTUB FAUCET

[76] Inventor: Roderick A. Williams, 236 Garcia St., Albuquerque, N.Mex. 87123

[21] Appl. No.: 09/083,066

[22] Filed: May 21, 1998

[51] Int. Cl.[6] .............. E03C 1/04; G05D 23/12
[52] U.S. Cl. ................... 236/12.12; 236/12.15; 4/676
[58] Field of Search .............. 236/12.12, 12.11, 236/12.15; 4/676, 677; 364/528.2

[56] References Cited

U.S. PATENT DOCUMENTS

| | | | |
|---|---|---|---|
| 4,854,498 | 8/1989 | Stayton | 236/12.12 |
| 4,923,116 | 5/1990 | Homan | 236/12.12 |
| 4,945,943 | 8/1990 | Cogger | 137/360 |
| 5,358,177 | 10/1994 | Cashmore | 236/12.12 |
| 5,361,215 | 11/1994 | Tompkins et al. | 364/505 |
| 5,577,660 | 11/1996 | Hansen | 4/677 X |

FOREIGN PATENT DOCUMENTS

| | | | |
|---|---|---|---|
| 2251709 | 7/1992 | United Kingdom | 236/12.15 |
| WO85/03764 | 8/1985 | WIPO | 4/676 |

*Primary Examiner*—William Wayner
*Attorney, Agent, or Firm*—Kenneth L Tolar

[57] ABSTRACT

A temperature and flow controller for a bath tub or shower is disclosed. The device includes a panel that replaces or surrounds the standard bath tub water valves. Within the panel is a control assembly in communication with temperature sensors in the shower head and the bath tub faucet as well as control valves on the hot and cold water supply lines. The temperature sensors are immediately downstream from a unique, two stage mixing chamber having a rotatable impeller in a first section and a helically grooved inner surface in a second section to thoroughly mix hot and cold water therein. The controller also includes means for enabling water flow at a preset time of day, for a predetermined duration or to deliver a predetermined volume of water.

11 Claims, 4 Drawing Sheets

WATER FLOW AND TEMPERATURE CONTROLLER FOR A BATHTUB FAUCET

BACKGROUND OF THE INVENTION

The present invention relates to a controller system which automatically and precisely regulates the temperature and flow of water dispensed through a bath tub faucet or a shower.

DESCRIPTION OF THE PRIOR ART

Achieving a constant, comfortable water temperature when taking a bath or shower is often difficult. The hot and cold water supply pressure typically varies such as whenever valves on the same water system are manipulated. In addition, stagnant water within the hot water supply line is typically cold requiring the line to be flushed for a period of time before hot water is delivered. During such lag time, the hot water valve must be gradually throttled to achieve a desired temperature. Because of the above described dynamics, a user may incur numerous temperature fluctuations while taking a shower. Such temperature fluctuations may expose the user to frigid or scalding water.

Furthermore, water is scarce in certain arid locations and sometimes citizens are restricted in times and frequencies in which they may bathe since the majority of water expended by most households relates to showering or bathing. A significant amount of water is wasted when users drain the hot water line or adjust the water temperature. In addition, in such arid areas, the water pressure may be low requiring a user to bathe longer to completely rinse soap and shampoo. Accordingly, there is currently a need for a device that automatically regulates the water temperature and flow duration of bath water while increasing the pressure thereof to provide a bather with water that is at a consistent temperature while conserving the total amount of water consumed.

Various flow and temperature control devices for bathtubs exist in the prior art. For example, U.S. Pat. No. 5,577,660 issued to Hansen relates to a temperature sensing automatic faucet activated by a touchless switch such as an infrared sensor for automatically regulating water temperature. The device includes one or more temperature sensors in communication with a controller and control valve that maintain the faucet water outlet temperature at a predetermined value.

U.S. Pat. No. 5,361,215 issued to Tompkins et al relates to a spa control system which calculates the time required to heat water to a desired temperature. The heating rate of the spa can then be determined to activate a heating element at a proper time and for a sufficient duration to achieve a desired water temperature.

U.S. Pat. No. 5,358,177 issued to Cashmore relates to a fluid flow and temperature control apparatus for supplying a liquid at a constant temperature. The device includes flow meters having a rapid response time and motor driven valves. Further accuracy may be obtained by sensing the supply temperatures in addition to the flow rates.

U.S. Pat. No. 4,923,116 issued to Homan relates to a bath water control system which controls the water temperature as well as the start and duration times. The device further includes a mixing valve having a motor operated hollow piston.

U.S. Pat. No. 4,945,943 issued to Cogger relates to a computerized water faucet including a control panel for selectively delivering water at a desired temperature or pressure.

U.S. Pat. No. 4,854,498 issued to Stayton relates to a shower temperature control system including a single mixing valve connected between hot and cold water sources for delivering water at a desired temperature.

Conventional water and temperature flow controllers are typically inefficient in that the hot and cold water streams are not adequately mixed prior to a temperature being measured resulting in inaccurate and erratic control. Simply blending hot and cold water usually results in the resulting mixture having temperature gradients which may provide an inaccurate reading to a controller. The present invention provides a controller having a unique, two stage mixing chamber designed to thoroughly mix hot and cold water, downstream from which are temperature sensors for immediately providing an accurate temperature to a control assembly.

SUMMARY OF THE INVENTION

The present invention relates to a water flow and temperature control device for a bathtub or shower. The device comprises a waterproof housing having manual hot and cold water valves thereon. Alternatively, the housing surrounds the conventional bath tub water valves. The hot and cold water valves are in communication with the hot and cold water supply lines in a shower or bath tub. Downstream from the manual valves are electronic control valves in communication with a controller assembly. The hot and cold water supply lines are then coupled with a two stage mixing chamber having an impeller in the first section that rotates to facilitate the mixing of the hot and cold water. The resulting hot and cold water mixture is delivered to a second section of the mixing chamber having a helical ridge on its inner surface causing the water to flow along a spiral path further enhancing mixing. The outlet of the second chamber has a cross-sectional area substantially smaller than the first section and the supply piping to increase the resulting water pressure. A block valve and flow meter are immediately downstream from the mixing chamber and are each in communication with the controller assembly allowing the controller assembly to disable water flow after a predetermined volume of water has been delivered, at a preset time of day or after a predetermined duration. The housing has a plurality of function keys thereon allowing a user to selectively vary the target output temperature as well as the duration or time of day that water is delivered. A temperature sensor is placed both at the outlet of the shower head and bathtub faucet which transmits a signal to the controller to throttle the electronic control valves whenever the sensors fail to detect a temperature within a predetermined range. A bathtub faucet extends from the housing and is movable between extended and retracted positions to interchangeably divert water flow from the bath tub faucet to the shower head. It is therefore an object of the present invention to provide a water flow and temperature controller for a bathtub that increases the output water pressure thereby conserving water.

It is yet another object of the present invention to provide a water flow and temperature controller for a bathtub that precisely controls the output water temperature.

It is yet another object of the present invention to provide a water flow and temperature controller for a bathtub having a unique two stage mixing chamber that thoroughly mixes hot and cold water immediately prior to a temperature measurement being taken. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
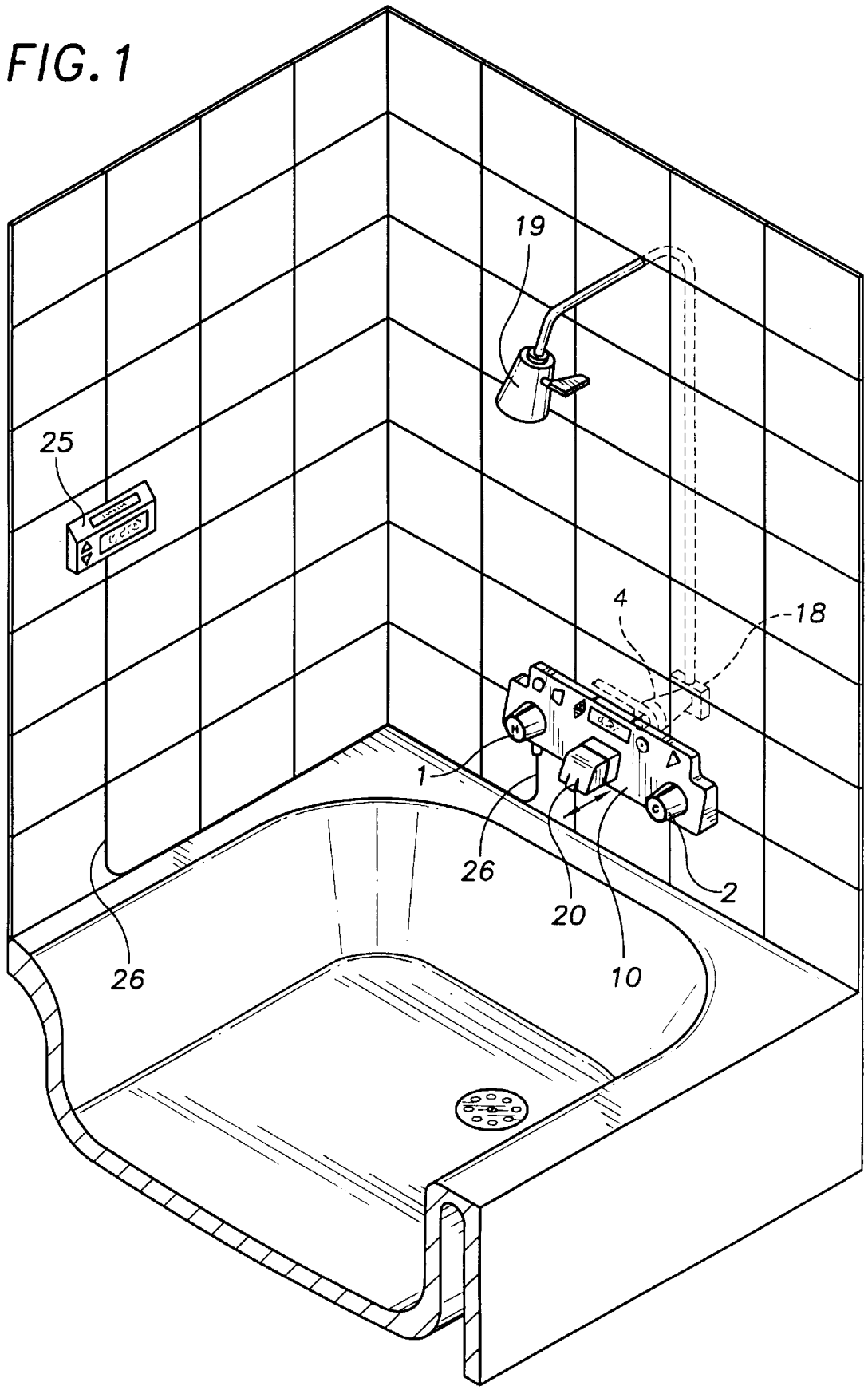
FIG. 1 depicts the housing secured within a bathtub stall.
Figure 2:
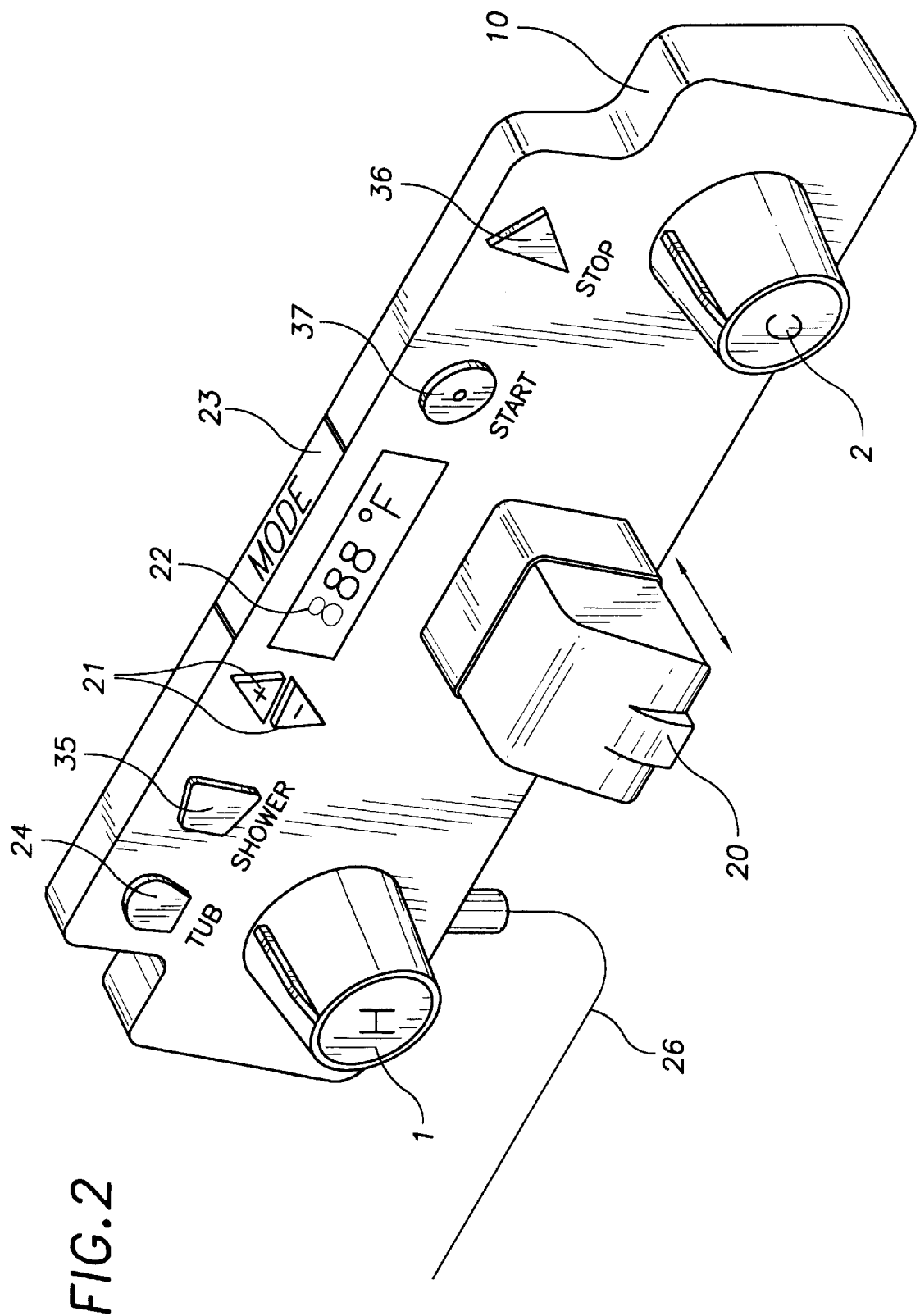
FIG. 2 is a close up view of the housing according to the present invention.
Figure 3:
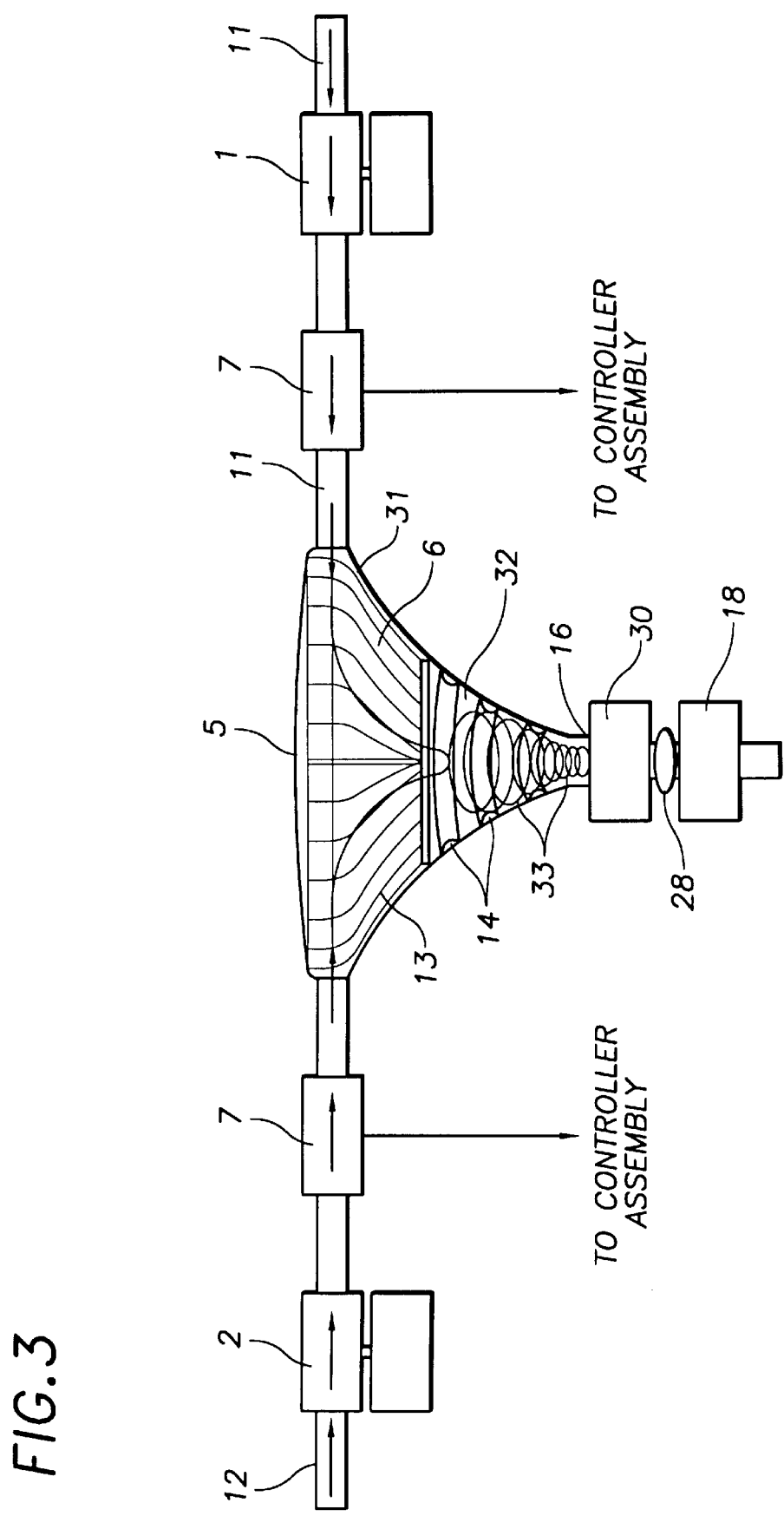
FIG. 3 depicts an internal view of the two stage mixing chamber.
Figure 4:
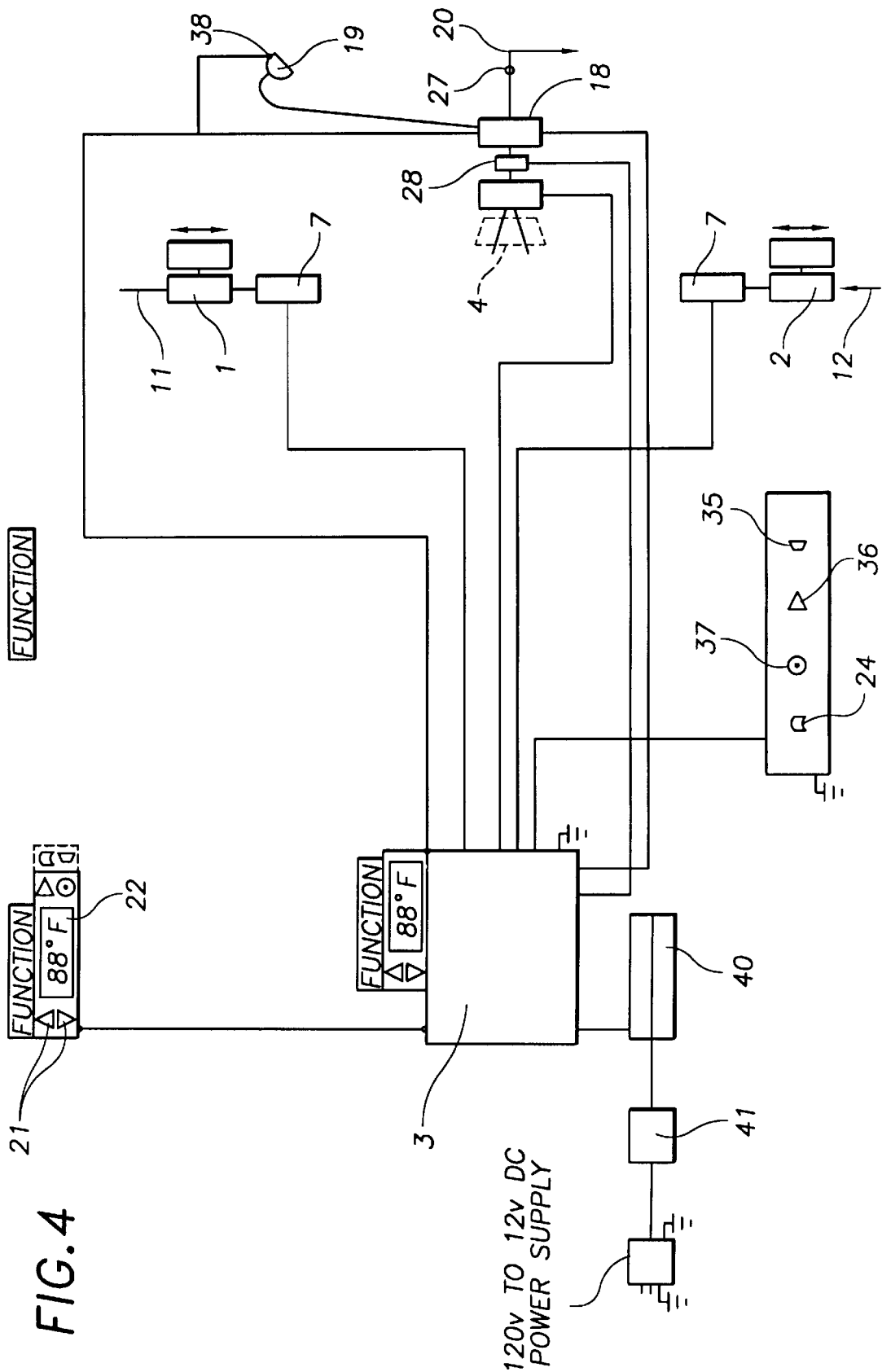
FIG. 4 depicts a schematic of the various components.

Referring now to FIGS. 1 through 4, the present invention relates to a water temperature and flow controller for a bath tub that utilizes a conventional controller and timer assembly 3. The device comprises a housing 10 having a hot 1 and a cold 2 water valve thereon which are coupled with the hot 11 and cold water 12 supply lines on a bath tub or shower assembly. Alternatively, the housing 10 may be configured to surround the existing hot and cold water valves on a bath tub or shower which are then coupled with the hot and cold water supply lines. Downstream from each valve is a variable electronic control valve 7 in communication with the control assembly 3 for adjusting the water flow when receiving an instructional signal from the control assembly.

Water from each control valve is directed to a unique, two stage mixing chamber 4. The mixing chamber is designed to thoroughly mix hot and cold water immediately prior to a temperature being measured in order to transmit an accurate reading to the controller assembly. The mixing chamber includes a substantially conical hollow cover member 5 with the hot and cold water supply lines in communication with the interior thereof. The hot and cold water lines are preferably attached to the cover at diametrically opposed locations and enter the chamber from opposite directions so that the hydraulic energy generated by the flowing water will rotatably drive an impeller 6 therein. The impeller is received within a first section 31 of the chamber and has a central opening through which water may flow. The impeller is conventional having a plurality of blades 13 radially extending from the central opening. Each blade preferably has a tapered distal edge that conforms to the interior of the cover allowing the impeller to unobstructively rotate therein. Accordingly, the impeller has a substantially conical cross-sectional configuration. Water is directed from the first section through the central opening and to the smaller second section 32 of the mixing chamber.

The second section 15 has a ridge 14 helically disposed about its interior wall forming a spiraled groove therebetween. The spiraled groove and ridge direct water through the second section along a winding path 33 further enhancing the mixing thereof. The mixing chamber reduces to an outlet 16 having a cross-sectional area sized smaller than the supply piping to increase the original water pressure. Accordingly, the outlet piping may be sized accordingly to deliver higher pressure water through the bath tub faucet or shower head.

Immediately downstream from the mixing chamber is an electronically controlled block valve 30. The block valve disables water flow when receiving a predetermined signal from the control assembly. A diverter valve 18 is downstream from the block valve and is movable between two positions to direct the water mixture to either the showerhead 19 or the bath tub faucet 20. The valve 18 is operable with a switch (not pictured) activated by the bath tub faucet. The faucet 20 is movable between an extended and a retracted position so that when the spout is retracted, the switch directs the valve via the electronic control assembly, to divert water to the showerhead. When the waterspout is extended, the switch is deactivated and water is diverted from the valve directly to the bath tub faucet.

The desired temperature of the water is selected by the user via a plurality of control keys on the housing. Directional arrow keys 21 are located adjacent to a liquid crystal display 22 for adjusting the desired temperature or the stop, start and duration times depending upon the selected mode. A mode button 23 adjacent the display allows the user to select and view the function being adjusted. If the temperature set mode has been selected, the up (+) and down(−) arrow keys are used to increase or decrease the target temperature respectively which will be simultaneously displayed on the display screen. Once the target temperature has been selected, the control assembly will maintain the water exiting the bath tub faucet or shower head at the selected temperature.

Tub 24 and shower 35 selection buttons are also provided allowing a user to program the various functions for either the tub or shower. Separate control loops for the shower and bath tub are preferred since separate temperature sensors are used as described below. Start 36 and stop 37 buttons are also provided. A remote control means 25 may be mounted in any convenient location using conventional attachment means. The remote control unit contains all of the functions keys located on the housing and has a cord 26 connected thereto with a plug at a distal end which may be coupled with a receptacle on the housing.

Temperature sensors 38, 27 are disposed within the showerhead and the tub faucet respectively which transmit current temperature readings to the electronic control assembly. If the temperature is not at the preselected value, the control assembly will manipulate the appropriate control valve. A digital flow meter 28 is disposed between the block valve and the diverter valve for measuring the current flow rate or total volumetric flow therefrom. The flow information is transmitted to the control assembly which may close the block valve to disable water flow after a preselected volume of water has been delivered or may open and close the valve at a preselected time of day.

Precise control of effluent water temperature is maintained due to the unique design of the mixing chamber in which minimal volumes of hot and cold water are mixed immediately after which a temperature is measured. The measured temperature is transmitted to the control assembly and the water control valves are immediately adjusted. Accordingly, the control functions of the present invention react to a more accurate temperature measured at a strategic location allowing the system to respond more quickly and effectively to produce a water effluent having a desired temperature.

The entire unit is preferably powered by rechargeable Ni-Cad batteries 40. The batteries are continuously recharged by a standard A/C outlet using a low voltage output transformer 41. The use of battery power also allows the device to be used for a predetermined duration even if AC power is unavailable. The control assembly uses conventional control and timer circuits that are currently known in the prior art, are therefore not described or depicted in extreme detail.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a bath tub or shower assembly having hot and cold water supply lines both in communication with a shower head and bath tub faucet, a water flow and temperature controller comprising:

a controller means;

a control valve disposed on said hot and cold water supply lines each operable between a fully opened and closed position and each in communication with said controller means;

a temperature sensor disposed within said faucet and said shower head for measuring the temperature of water exiting therefrom, each of said sensors in communication with said control assembly whereby said controller manipulates said control valves to maintain water exiting said shower and said faucet at a preselected temperature;

a hollow mixing chamber having an interior, a pair of inlets and an outlet each in communication with said interior, a first inlet in communication with said hot water supply line and a second inlet in communication with said cold water supply line; said chamber having first section with an impeller disposed within said first section, said impeller hydraulically rotatable by flow of said hot and cold water to thoroughly mix hot and cold water flowing thereto.

2. A device according to claim 1 wherein said second chamber further includes a second section in fluid communication with said first section having a cross-sectional area that gradually decreases toward an outlet to sufficiently increase the pressure of water entering said mixing chamber.

3. A device according to claim 2 wherein said second section further includes a ridge helically wound about the interior surface of said second section forming a spiraled groove therebetween to direct water through said second section along a winding path thereby facilitating the mixing of hot and cold water streams entering said mixing chamber.

4. A device according to claim 1 further comprising a block valve means immediately downstream from said mixing chamber and in communication with said controller means for completely disabling flow upon receiving a predetermined signal from said controller means.

5. A device according to claim 4 further comprising a flow measuring means downstream from the mixing chamber in communication with said controller means for selectively closing said block valve means after a predetermined volume of water has flowed therethrough.

6. A device according to claim 4 wherein said controller means further comprises a timer means for activating said block valve means at a predetermined time of day or for a predetermined duration.

7. A device according to claim 1 wherein said controller means further comprises an adjustment means for selectively varying the preselected temperature value of said water.

8. A device according to claim 1 further comprising a remote control means in communication with said controller means for manipulating said controller means from a remote location.

9. A device according to claim 1 wherein said controller means is powered with a rechargable battery means.

10. A device according to claim 1 further comprising a diverter means for selectively alternating water flow between said shower head and said bath tub faucet.

11. A device according to claim 6 wherein said diverter means comprises:

a valve means downstream from said mixing chamber movable between two positions for alternating flow between said shower head and said tub faucet, said bath tub faucet movable between an extended and a retracted position for activating a switch means to move said valve means from a first to a second position.

* * * * *